United States Patent
Weber et al.

(10) Patent No.: US 11,064,113 B1
(45) Date of Patent: Jul. 13, 2021

(54) IMAGE CAPTURE DEVICE WITH AN AUTOMATIC IMAGE CAPTURE CAPABILITY

(71) Applicant: GoPro, Inc., San Mateo, CA (US)

(72) Inventors: Clark Weber, San Mateo, CA (US); Nicholas Ryan Gilmour, San Jose, CA (US); Vadim Polonichko, San Diego, CA (US)

(73) Assignee: GoPro, Inc., San Mateo, CA (US)

( * ) Notice: Subject to any disclaimer, the term of this patent is extended or adjusted under 35 U.S.C. 154(b) by 42 days.

(21) Appl. No.: 16/709,244

(22) Filed: Dec. 10, 2019

Related U.S. Application Data

(60) Provisional application No. 62/785,485, filed on Dec. 27, 2018.

(51) Int. Cl.
*H04N 5/232* (2006.01)
*H04N 1/21* (2006.01)

(52) U.S. Cl.
CPC ....... *H04N 5/23222* (2013.01); *H04N 1/2145* (2013.01); *H04N 5/23218* (2018.08); *H04N 5/23245* (2013.01)

(58) Field of Classification Search
CPC ........... H04N 5/23222; H04N 5/23245; H04N 1/2145; H04N 5/23218
See application file for complete search history.

(56) References Cited

U.S. PATENT DOCUMENTS

| | | | | |
|---|---|---|---|---|
| 8,130,279 B2* | 3/2012 | Masaki | ............... | H04N 5/772 348/220.1 |
| 8,525,893 B2* | 9/2013 | Ishida | ............... | H04N 5/2353 348/220.1 |
| 10,645,468 B1* | 5/2020 | Kislevitz | ............. | G11B 27/102 |
| 2005/0244033 A1* | 11/2005 | Ekin | ............... | H04N 1/2187 382/103 |
| 2006/0216001 A1* | 9/2006 | Shin | ............... | H04N 1/212 386/225 |
| 2014/0327940 A1* | 11/2014 | Amtrup | ............... | G06K 9/18 358/473 |
| 2015/0154452 A1* | 6/2015 | Bentley | ............... | G11B 27/031 386/201 |
| 2015/0229889 A1* | 8/2015 | Boettiger | ............. | H04N 5/2258 348/262 |
| 2016/0080652 A1* | 3/2016 | Shirota | ............. | G06K 9/00221 348/222.1 |
| 2016/0155472 A1* | 6/2016 | Elg | ............... | H04N 5/2258 386/223 |
| 2016/0188980 A1* | 6/2016 | Martin | ............... | G06K 9/00771 382/103 |
| 2016/0203370 A1* | 7/2016 | Child | ............... | G06K 9/00288 348/143 |
| 2017/0294694 A1* | 10/2017 | Tso | ............... | H01M 10/63 |

* cited by examiner

*Primary Examiner* — Timothy J Henn
(74) *Attorney, Agent, or Firm* — Esplin & Associates, PC

(57) ABSTRACT

An image capture device may automatically capture images. An image sensor may generate visual content based on light that becomes incident thereon. A depiction of interest within the visual content may be identified, and one or more images may be generated to include one or more portions of the visual content including the depiction of interest.

18 Claims, 7 Drawing Sheets

METHOD 200

201 — Generate output signal conveying visual information based on light that becomes incident on an image sensor, the visual information defining visual content.

202 — Identify a depiction of interest within the visual content

203 — Generate one or more images from the visual content based on the depiction of interest.

visual content 502 visual content 504 visual content 602 visual content 604

IMAGE CAPTURE DEVICE WITH AN AUTOMATIC IMAGE CAPTURE CAPABILITY

FIELD

This disclosure relates to an image capture device that automatically captures images.

BACKGROUND

Camera users may wish to capture interesting moments within images. However, manually using camera controls to capture interesting moments may be difficult or make it difficult for the users to experience the interesting moments.

SUMMARY

This disclosure relates to an image capture device that automatically captures images. An image capture device may include a housing. The housing may carry one or more of an image sensor, an optical element, a processor, an electronic storage, and/or other components. The optical element may guide light within a field of view to the image sensor. The image sensor may generate an output signal conveying visual information defining visual content based on light that becomes incident thereon. The processor(s) may be configured to operate the image capture device. Operation of the image capture device may include identification of one or more depictions of interest within the visual content, and generation of one or more images from the visual content based on the depiction(s) of interest. The image(s) may include one or more portions of the visual content including the depiction(s) of interest.

An electronic storage may store visual information defining visual content, information relating to visual content, information relating to depictions of interest, information relating to images, and/or other information. Visual content may refer to content that may be consumed visually. Visual content may be included within one or more images and/or one or more videos. For example, visual content may be defined within one or more images and/or one or more video frames of a video. Visual content may be stored in one or more formats and/or one or more containers.

The housing may carry one or more components of the image capture device. The housing may carry (be attached to, support, hold, and/or otherwise carry) one or more of an image sensor, an optical element, a processor, an electronic storage, and/or other components.

The optical element may be configured to guide light within a field of view to the image sensor. In some implementations, the field of view may be greater than 180 degrees. In some implementations, the housing may carry one or more additional optical elements.

The image sensor may be configured to generate an output signal. The output signal may convey visual information based on light that becomes incident on the image sensor and/or other information. The visual information may define visual content. In some implementations, the housing may carry one or more additional image sensors.

The processor(s) may be configured by machine-readable instructions. Executing the machine-readable instructions may cause the processor(s) to facilitate operation of the image capture device. The machine-readable instructions may include one or more computer program components. The computer program components may include one or more of an interest detection component, a generation component, and/or other computer program components.

The interest detection component may be configured to identify one or more depictions of interest within the visual content. In some implementations, a depiction of interest within the visual content may be identified based on depiction of one or more things within the visual content, one or more visual characteristics of the visual contents, and/or other information.

The generation component may be configured to generate one or more images from the visual content based on the depiction(s) of interest and/or other information. The image(s) may include one or more portions of the visual content including the depiction(s) of interest.

In some implementations, a depiction of interest may occur during a moment of interest, and the image(s) may include one or more preceding images, one or more subsequent images, and/or other images. A preceding image may correspond to a moment of time preceding the moment of interest. A subsequent image may correspond to a moment of time subsequent to the moment of interest.

In some implementations, a depiction of interest may occur during a moment of interest, and a number of the image(s) may be determined based on classification of one or more activities within the visual content during the moment of interest, classification of one or more actions within the visual content during the moment of interest, and/or other information. In some implementations, the number of the image(s) may be determined further based on classification of one or more locations within the visual content during the moment of interest.

In some implementations, a number of the image(s) may be determined based on motion within the visual content and/or other information.

In some implementations, the image(s) may be generated based on an operation of the image capture device in a smart image capture mode and/or other modes. The operation of the image capture device in the smart image capture mode may include setting of one or more resolutions to generate the image(s) and may not include generation of a video. The resolution(s) with which the image(s) are generated may be higher than a resolution with which the image capture device generates videos.

In some implementations, the generation component may be configured to generate one or more videos based on the visual content and/or other information. The image(s) may be provided as preview of the video(s). A number of the image(s) may be determined based on a progress length of a video and a number of identified depictions of interest.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

DETAILED DESCRIPTION

Figure 1:
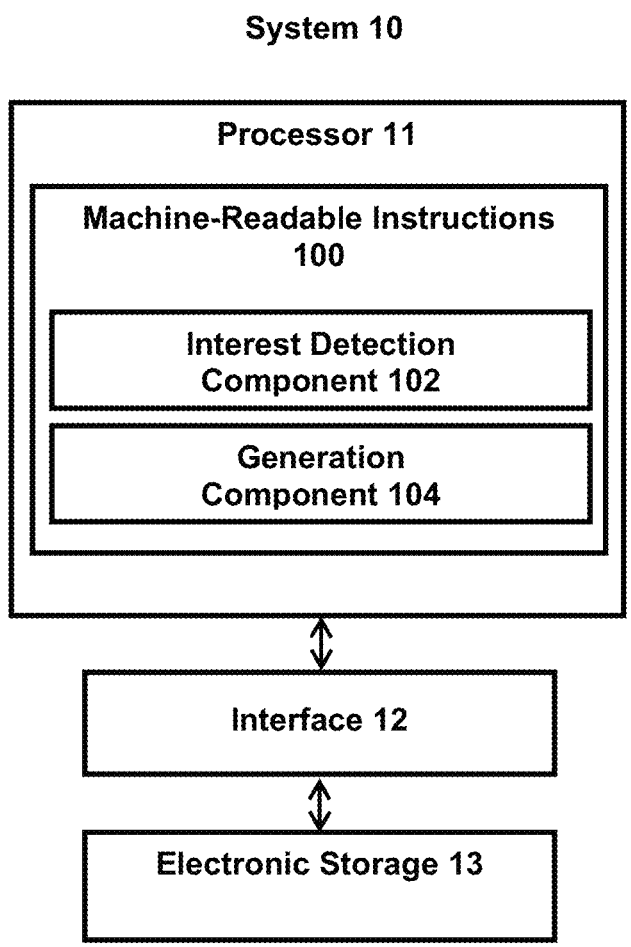
FIG. 1 illustrates a system that automatically captures images.

FIG. 1 illustrates a system 10 for automatically capturing images. The system 10 may include one or more of a processor 11, an interface 12 (e.g., bus, wireless interface), an electronic storage 13, and/or other components. An output signal conveying visual information defining visual content may be generated based on light that becomes incident on an image sensor. The processor 11 may identify one or more depictions of interest within the visual content. The processor 11 may generate one or more images from the visual content based on the depiction(s) of interest. The image(s) may include one or more portions of the visual content including the depiction(s) of interest.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store visual information defining visual content, information relating to visual content, information relating to depictions of interest, information relating to images, and/or other information.

Visual content may refer to content that may be consumed visually. Visual content may be included within one or more images and/or one or more videos. For example, visual content may be included within one or more images and/or one or more video frames of a video. As used herein, term video frame may be used to refer to one or more of an image frame, frame of pixels, encoded frame (e.g., I-frame, P-frame, B-frame), and/or other types of video frame. Visual content may be stored in one or more formats and/or one or more containers. Visual content may be defined by visual information.

Visual content may include pixels with colors defined by values of multiple channels. A pixel may represent a unit of an image that may be displayed and/or represented. Arrangement of pixels may form the visual content. Individual pixels may be defined by values of one or more channels. A channel may store color information for one color component of a color space (color model, color system). For example, the visual content may include pixels with colors defined by values of one or more of a red channel, a green channel, a blue channel (RGB color space), and/or other channels. The visual content may include pixels with colors defined by values of one or more of a hue channel, a saturation channel, a value channel (HSV color space), and/or other channels. Use of other channels and/or color spaces are contemplated.

Figure 3:
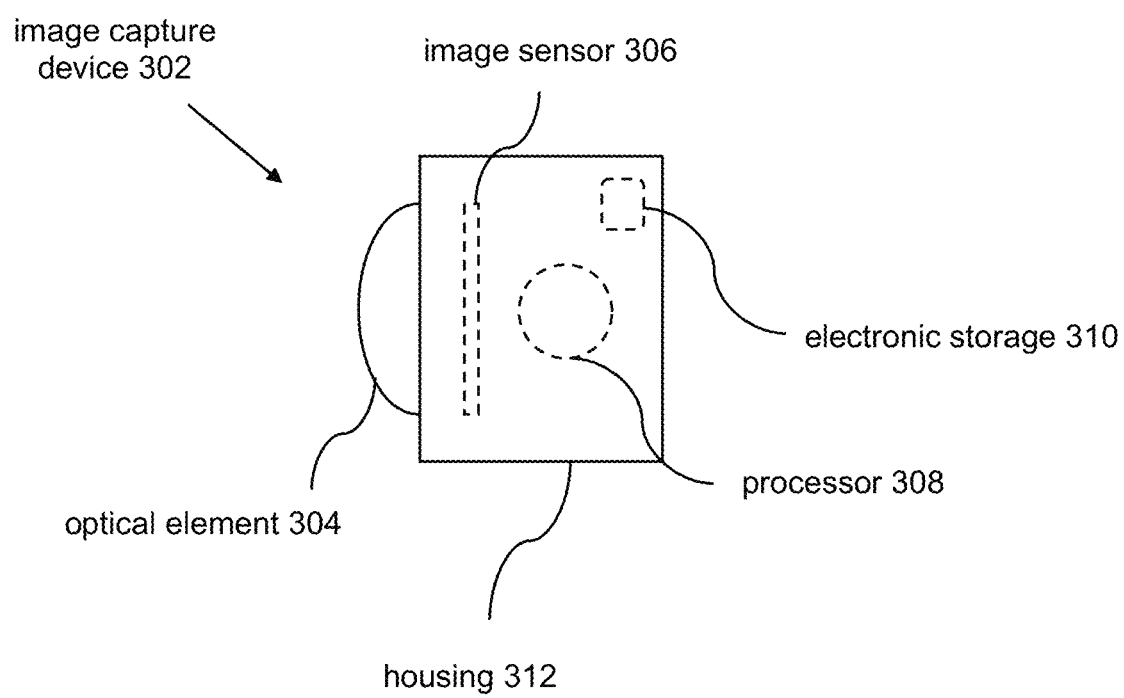
FIG. 3 illustrates an example image capture device.

FIG. 3 illustrates an example image capture device 302. Visual content may be captured by the image capture device 302 and/or other image capture devices. The image capture device 302 may include a housing 312, and the housing 312 may carry (be attached to, support, hold, and/or otherwise carry) one or more components of the image capture device 302, such as one or more of an optical element 304, an image sensor 306, a processor 308, an electronic storage 310, and/or other components. The image capture device 302 may include multiples of the components shown in FIG. 3 and/or other components. For example, the image capture device 302 may include multiple optical elements and multiple image sensors, with the multiple optical elements configured to enable the image capture device 302 to capture spherical visual content (e.g., content of spherical images/videos). Other configurations of image capture devices are contemplated.

The optical element 304 may include instrument(s), tool(s), and/or medium that acts upon light passing through the instrument(s)/tool(s)/medium. For example, the optical element 304 may include one or more of lens, mirror, prism, and/or other optical elements. The optical element 304 may affect direction, deviation, and/or path of the light passing through the optical element 304. The optical element 304 may be configured to guide light within a field of view to the image sensor 306. In some implementations, the field of view of the optical element 304 may be greater than 180 degrees. In some implementations, the housing 312 may carry one or more additional optical elements.

The image sensor 306 may include sensor(s) that converts received light into one or more output (electrical) signals. The image sensor 306 may generate output signals conveying visual information that defines visual content. The visual content may be included within and/or be used to generate one or more images and/or one or more videos (e.g., one or more video frames of a video). In some implementations, the image sensor 306 may include one or more of a charge-coupled device sensor, an active pixel sensor, a complementary metal-oxide semiconductor sensor, an N-type metal-oxide-semiconductor sensor, and/or other image sensors.

The image sensor 306 may be configured to generate output signals conveying visual information (defining visual content) based on light that becomes incident thereon and/or other information. For example, the optical element 304 may be configured to guide light within a field of view to the image sensor 306, and the image sensor 306 may be configured to generate output signals conveying visual information based on light that becomes incident thereon via the optical element 304. In some implementations, the housing 312 may carry one or more additional image sensors.

The processor 308 may include one or more processors (logic circuitry) that provide information processing capabilities in the image capture device 302. The processor 308 may provide one or more computing functions for the image capture device 302. The processor 308 may operate and/or send command signals to one or more components of the image capture device 302 to facilitate operation of the image capture device 302. For example, the processor 308 may facilitate operation of the image capture device 302 in capturing image(s) and/or video(s), facilitate operation of the optical element 304 (e.g., change how light is guided by the optical element 304), and/or facilitate operation of the image sensor 306 (e.g., change how the received light is converted into information that defines images/videos and/or how the images/videos are post-processed after capture). The processor 308 may include and/or perform one or more functionalities of the processor 11 shown in FIG. 1.

The image capture device 302 may include other sensors, such as one or more motion sensors. A motion sensor may refer to one or more sensors that converts experienced motions into output signals. The output signals may include electrical signals. A motion sensor may generate output signals conveying information that characterizes motions and/or positions of the motion sensor and/or device(s) carrying the motion sensor, such as the image capture device 302. The motions/positions characterized by a motion sensor may include translational motions/positions and/or rotational motions/positions. For example, a motion sensor may refer to a set of motion sensors, which may include one or more inertial measurement units, one or more accelerometers, one or more gyroscopes, and/or other motion sensors.

The electronic storage 310 may refer to electronic storage medium that electronically stores information. The electronic storage 310 may store software algorithms, information determined by the processor 308, information generated by the image sensor 306, information received remotely, and/or other information that enables the image capture device 302 to function properly. The electronic storage 310 may be used as temporary and/or permanent storage of information generated by the image capture device 302. For example, visual information generated by the image sensor 306 may be stored as one or more images and/or one or more videos within the electronic storage 310 as one or more files for later retrieval and/or playback. Visual information generated by the image sensor 306 may be temporarily stored within the electronic storage 310 (e.g., one or more portions of the electronic storage 310 is used as a buffer) to perform identification of depiction of interest within the visual content defined by the visual information. Based on an identification of a depiction of interest within the visual content, one or more images including the depiction of interest may be generated from the visual content. Based on the visual content not including a depiction of interest, the visual content (corresponding visual information) may be discarded.

In some implementations, the image capture device 302 may be configured to operate in a smart image capture mode and/or other modes. The operation of the image capture device 302 in the smart image capture mode may not include generation of a video. For example, the operation of the image capture device 302 in the smart image capture mode may include generation of output signals by the image sensor 306, with the output signals conveying visual information such as for the image capture device 302 to generate a video. But rather than generating a video, the visual content captured by the image sensor 306 may be analyzed by the processor 308 to determine whether and when the visual content includes a depiction of interest.

The processor 308 may use the visual content to generate one or more images based on the depiction of interest, with the image(s) including those portion(s) of the visual content including the depiction of interest. Other portions of the visual content and/or the portions of the visual information not used by the processor 308 to generate the image(s) may be discarded (e.g., deleted; removed from memory, such as the electronic storage 310; left in memory buffer to be overwritten). Thus, the image capture device 302 may "record" those portions of the visual content that is of interest to user(s) without "recording" a video (e.g., storing information defining the video in the electronic storage 310 for later retrieval and/or playback).

The operation of the image capture device 302 in the smart image capture mode may include setting of one or more resolutions to generate the image(s). The resolution(s) with which the image(s) are generated may be higher than a resolution with which the image capture device 302 generates videos. Since the operation of the image capture device 302 in the smart image capture does not include generation of video(s), the image capture device 302 may have more storage space (e.g., within the electronic storage 310) to store images. Thus, high-quality images may be stored, such as by using a higher resolution than the maximum resolution at which the image capture device 302 may generate videos.

The image capture device 302 may operate in the smart image capture mode based on activation of the smart image capture mode by a user. For example, one or more options to activate the smart image capture mode may be provided via one or more physical buttons (e.g., buttons on the housing 312 of the image capture device 302) and/or one or more virtual buttons (e.g., buttons presented on a display of the image capture device 302). Activation of the option may result in the image capture device 302 identifying depictions of interest within the visual content and generating images of the visual content including the depictions of interest. For example, during the operation of the image capture device 302 in the smart image capture mode, inclusion of depiction of interest within the visual content may be identified based depiction of one or more things (e.g., subjects, objects, motions, emotions) within the visual content, one or more visual characteristics (e.g., color/hue distribution, contrast, uniformity) of the visual content, and/or other information.

Referring back to FIG. 1, the processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate operation of an image capture device, such as the image capture device 302 shown in FIG. 3. The machine-readable instructions 100 may include one or more computer program components. The machine-readable instructions 100 may include one or more of an interest detection component 102, a generation component 104, and/or other computer program components.

The interest detection component 102 may be configured to identify one or more depictions of interest within the visual content. A depiction of interest may refer to visual representation within the visual content that one or more user may find interesting and/or may be interested in capturing in media form (e.g., image(s), video(s)). A depiction of interest may occur within visual content at a moment of interest. A moment of interest may include one or more points in time and/or one or more durations of time. For example, a depiction of interest may be captured by the image capture device 302 at one point in time, within a single image, and/or within a single video frame. A depiction of interest may be captured by the image capture device 302 over a duration of time, within multiple images, and/or within multiple video frames. A depiction of interest may be included within the entire spatial view of the visual content (e.g., entire scene captured within an image or multiple images) or one or more spatial portions of the visual content (e.g., one or more portions of a scene captured within an image or multiple images). That is, the depiction of interest may be included within the entirety of the visual content at the moment of interest or within one or more spatial portions of the visual content at the moment of interest.

In some implementations, a depiction of interest within the visual content may be identified based on depiction of one or more things within the visual content, one or more visual characteristics of the visual contents, and/or other information. The visual content and/or other information may be analyzed to identify one or more things depicted within the visual content. The visual content and/or other information may be analyzed to determine one or more visual characteristics of the visual contents. Other information may be identified and/or determined for identification of depiction of interest within the visual content.

A depiction of one or more things within the visual content may refer to inclusion of visual representation of one or more things within the visual content. A thing included within the visual content may refer to a living thing (e.g., person, animal, plant), an inanimate thing (e.g., vehicle, sporting equipment, tool), a moving thing (e.g., a moving person, a moving vehicle, wave), a stationary thing (e.g., person standing still, house, trees), a characteristic of the thing (e.g., biological characteristic of a person, characteristic of a person's clothing, characteristic of a vehicle), an emotion (e.g., a person smiling, laughing, yelling, screaming, crying), an activity (e.g., basketball, skiing, hiking, surfing, flying), an action (e.g., jumping, hitting, falling, standing up, spinning), a location (e.g., beach, underwater, desert, snowy scene, forest, mountain, sky), and/or other things included within the visual content. A depiction of interest may be identified based on classification of things depicted within the visual content. A classification of a thing within the visual content may include a determination of whether the thing is present or not present (e.g., true or false) within the visual content and/or a determination of the probability, score, metric value, and/or other value that the thing is present within the visual content.

A depiction of interest may include a depiction of a particular thing and/or a depiction of a combination of particular things. For example, a depiction of a particular person, a depiction of multiple persons exhibiting a certain emotion, a depiction of a particular activity at a particular location may be identified as a depiction of interest. Other identification depiction of interest based on a depiction of a thing or a combination of things are contemplated.

A depiction of interest may be determined based on a hierarchy of classification of things depicted within the visual content. For example, an activity may refer to the overall behavior, task, and/or event engaged in by a person, an action may refer to an act that may be performed during the activity, and a location may refer to the setting and/or the context in which the activity/action is taking place. For instance, an activity may include a person playing basketball or skating, an action may include the person jumping, and the location may include an indoor gym, a park, or the beach. A depiction of a person jumping during a basketball activity within an indoor gym may not be identified as a depiction of interest, while a depiction of a person jumping during a skating activity at the beach may be identified as a depiction of interest. Other identification of depiction of interest based on hierarchy of classification of things are contemplated.

One or more classification of things depicted within the visual content may change the thresholds of things that are identified as being of interest. For example, a depiction of a person jumping during a basketball activity may be identified as a depiction of interest based on the jump being of or greater than a certain height while a depiction of a person jumping during a skating activity may be identified as a depiction of interest based on the jump being of or greater than a smaller height than the jump during the basketball activity.

One or more visual characteristics of the visual content may refer to one or more of feature, quality, quantity, trait, property, value, measurable factor, and/or other visual information relating to the visual content. For example, visual characteristic(s) of the visual content may include feature, quality, quantity, trait, property, value, measurable factor, and/or other information relating pixels making up the visual content, such as a color, contrast, brightness, and/or other characteristic of pixels. Visual characteristic(s) of the visual content may be analyzed to determine whether the visual characteristic(s) indicate inclusion of one or more depiction of interest within the visual content. Analysis of visual content may be performed on the visual content and/or a lower-resolution version of the visual content. For example, analysis of visual content of an image may be performed on the image and/or a lower-resolution thumbnail (smaller image that represents the image) of the image. Use of lower-resolution thumbnails of visual content for analysis may reduce the processing cost of the visual content analysis. For example, use of lower-resolution thumbnails for visual content analysis may reduce processing time, processing power, power/battery charge consumption, memory usage, and/or other processing cost of the visual content analysis.

In some implementations, one or more color space conversion may be applied to the visual content for analysis. For example, a lower-resolution thumbnail of the visual content may include RGB thumbnails and/or other thumbnails, and a color space transform may be performed on the RGB thumbnails to obtain HSV thumbnails. In some implementations, the hue of the HSV color space may be 360-cyclical and a 1-cyclical hue may be used for the analysis of the visual content. Other color space conversions are contemplated.

In some implementations, one or more of an auto white balance, a color matrix, a tone curve, a gamma correction, and/or a GTM look-up-table be applied to the visual content and/or the lower-resolution thumbnail to accentuate color discrimination within the visual content and/or the lower-resolution thumbnail. For example, a thumbnail of visual content may be dark and it may be difficult to discriminate the colors over the reduced resolution (e.g., 64×48). Application of the auto white balance, the color matrix, the tone curve, the gamma correction, and/or the GTM look-up-table may increase the distinction between the colors in the thumbnails and facilitate analysis of the visual content. For example, increasing the distinction between the lowers in the thumbnails may allow for better differentiation between the sky, the ground, and object(s) between the ground and the sky within the visual content/thumbnails.

In some implementations, visual content analysis may be performed using existing data for the visual content. For example, visual content analysis may be performed using an RGB thumbnail provided by an auto white balance block of an image capture device.

Analysis of visual content may include determination of values of one or more content metrics and/or other information. A content metric may refer to a one or more standards, systems, and/or factors for measuring visual content. A content metric may measure content of visual content based on visual (e.g., pixel) characteristics of the visual content. For example, a content metric may determine how the pixel characteristics of the visual content are used to determine the value of the content metric. A single or multiple content metrics may be used. For example, the content metric(s) used for visual content analysis may include one or more of a three-bands metric, a contrast metric, a uniformity metric, and/or other metric.

The three-bands metric may refer to a metric that measures visual content based on a division of visual content within three bands. A band may refer to a portion of the visual content. For example, a band of an image may refer to a strip (e.g., one or more columns, one or more rows) of pixels within the image. A three-bands metric may characterize the division of the visual content within a first band, a second band, and a third band, with the second band located between the first band and the third band. The three bands may be used to determine framing of the visual content, such as to what extent the visual content includes a depiction of the sky within a first band (top band), a depiction of a one or more objects between the sky and the ground within the second band (middle band), and a depiction of the ground within the third band (bottom band).

Figure 4A:
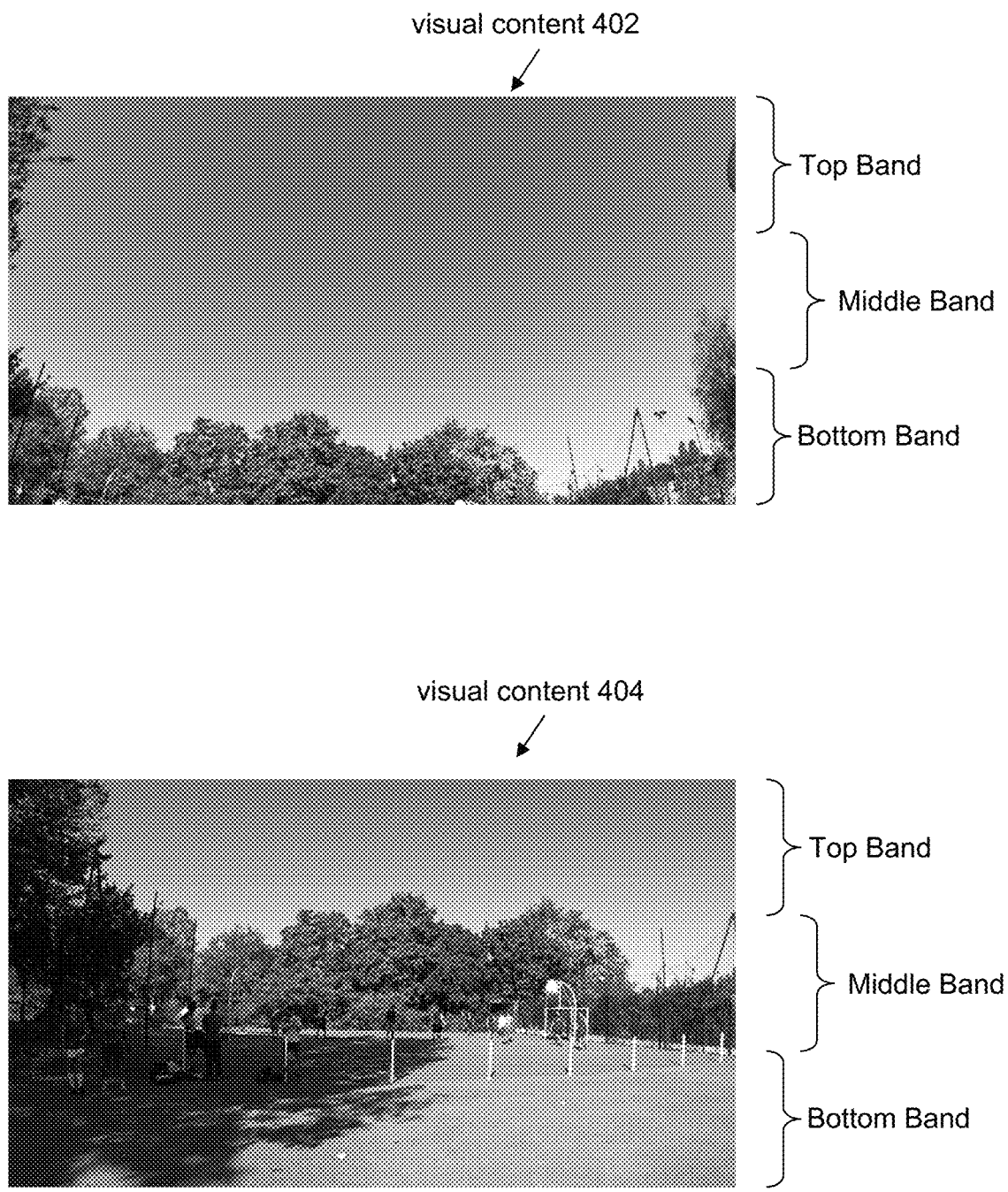
FIG. 4A illustrates example visual content evaluated using a three-bands metric.

For example, FIG. 4A illustrates example visual content 402, 404 evaluated using a three-bands metric. The visual content 402 may mostly include a depiction of sky within the top band and the middle band, and include a depiction of sky and trees within the bottom band. The visual content 404 may include a depiction of the sky and a little portion of a tree within the top band, include a depiction of trees, persons, and other objects within the middle band, and mostly include a depiction of the ground within the bottom band. The evaluation of the visual content 402, 404 using the three-bands metric may result in different values of the three-bands metric being determined for the visual content 402, 404. For example, the value of the three-bands metric for the visual content 402 may be lower than the value of the three-bands metric for the visual content 404 (or vice versa), and indicate that the visual content 404 has a better framing of the visual content 402.

Determination of the value of the three-bands metric for visual content may include segmenting the visual content into bands. The segmentation of the visual content into bands may enable evaluation of the visual content based on color characteristics of the pixels within individual bands. The visual content may be segmented into bands of same shape and/or size, or into bands of different shapes and/or sizes. Segmenting the visual content into bands may include one or more of analyzing different portions of the visual content as the bands, determining the bands within the visual content, dividing the visual content into the bands, extracting different portions of the visual content as the bands, identifying the bands within the visual content, locating the bands within the visual content, setting the bands within the visual content, and/or otherwise segmenting the visual content into bands. The bands may be organized in a top-down manner (e.g., top, middle, bottom as shown in FIG. 4A), in a side-to-side manner, or in other ways. For example, analysis of the visual content 402, 404 using top-down bands may account for the depiction of things below the horizon (e.g., the ground), the depiction of things above the horizon (e.g., the sky), and the depiction of things on or near the horizon (e.g., object(s) between the ground and the sky).

The value of the three-bands metric may be determined based on values of one or more channels of pixels within the individual bands and/or other information. For example, the channels by which colors of pixels are defined may include one or more of a hue channel, a saturation channel, a value channel, a red channel, a green channel, a blue channel, and/or other channels, and the value of the three-bands metric may be determined based on color characteristics of pixels within one or more of the hue channel (hue metric), the saturation channel (saturation metric), the value channel (value metric), the red channel (red metric), the green channel (green metric), the blue channel (blue metric), and/or other channels.

For example, the value of the three-bands metric may be determined based on values of the hue of pixels within the band, such as based on mean of hue, trimmed mean of hue, sigma mean of hue, and/or median of hue. Mean of hue may refer to the average of hue values of the pixels within the band. Trimmed mean of hue may refer to mean values calculated with removal of a certain amount of the lowest and highest hue values (e.g., removal of lowest 10% and highest 10% hue value). Same or different amounts may be removed from the two ends. Trimmed mean of hue may be determined by discarding a certain amount of the lowest and highest hue values before calculation of the mean value. The trimmed mean of hue may not be directly calculated from the hue channel. For example, RGB means may be computed on RGB thumbnails, and the hue and saturation mean values may be calculated from the RGB means. Sigma mean of hue may refer to mean values calculated using standard deviation of the hue values (e.g., mean with +/−3*sigma of hue). Median of hue may refer to the median hue values of the pixels within the band.

The use of one or more of the trimmed mean of hue, sigma mean of hue, and/or median of hue may enable calculation of the metric values that avoid outliers in the computation of the hue (e.g., colorful objects within the visual content that modifies the dominant hue may be discarded). The use of one or more of the trimmed mean of hue, sigma mean of hue, and/or median of hue may smooth the metric value generation.

In some implementations, the value of the three-bands metric may be determined based on comparison of values of one or more channels of pixels within different bands. For example, referring to FIG. 4A, the value of the three-bands metric may be determined based on comparison of values of one or more channels of pixels within the top band to the bottom band, and the comparison of values of one or more channels of pixels within the middle band to the top or bottom band, and/or other information.

Figure 4B:
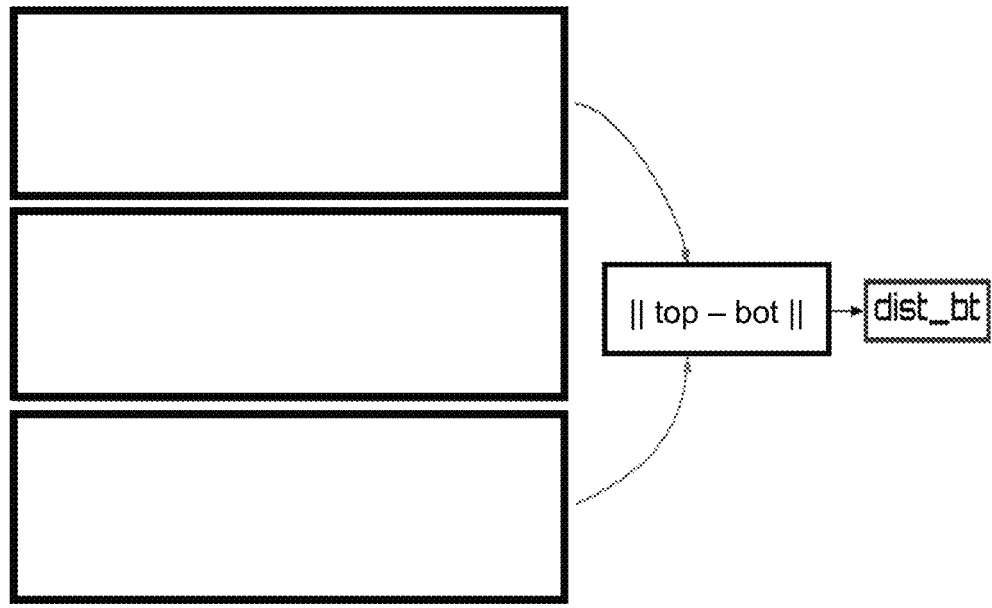
FIG. 4B illustrates example comparison of bands for a three-bands metric.
Figure 4B:
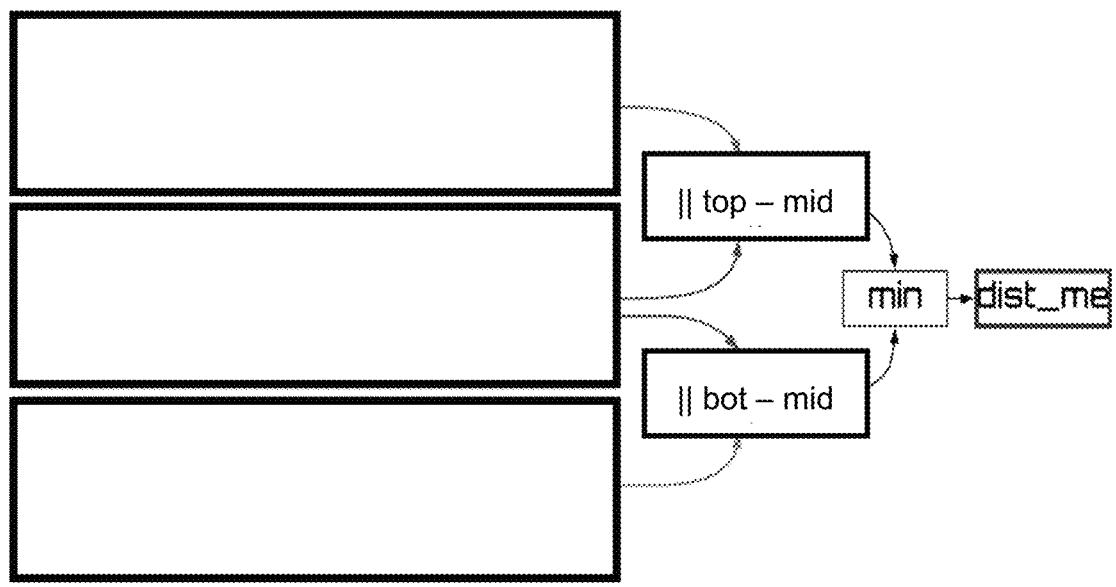

The comparisons may be used to determine the differences in pixel values (distances) between the bands. The distance between the top and bottom bands may be denoted as dist_bt and the distance between the middle band and the top/bottom band may be denoted as dist_me. For example, the distance between the top and bottom bands (dist_bt) may be calculated as shown in top of FIG. 4B, and the distance between the middle band and the top/bottom band (dist_me) may be calculated as shown in bottom of FIG. 4B, as minimum of (1) the distance between the middle and top bands and (2) the distance between the middle and bottom bands. The value of the three-bands metric may be determined based on the distances between the bands. For example, the value of the three-bands metric for the visual content may be determined as a linear interpolation between dist_bt and dist_me.

In some implementations, the value of the three-bands metric may characterize inclusion of a depiction of a sky within the top band, inclusion of a depiction of a ground within the bottom band, and inclusion of a depiction of one or more objects between the ground and the sky within the middle band. For example, the value of the three-bands may depend on the extent to which the top band includes a depiction of a sky, the bottom band includes a depiction of a ground, and the middle band includes a depiction of one or more objects (e.g., persons, animal, plant, vehicle, structure, landscape, horizon) between the ground and the sky. For example, the value of the three-bands metric may be low/minimized if the visual content is uniform, and the value of the three-bands metric may be high/maximized if the visual content is divided/balanced within three bands (or vice versa).

Figure 5:
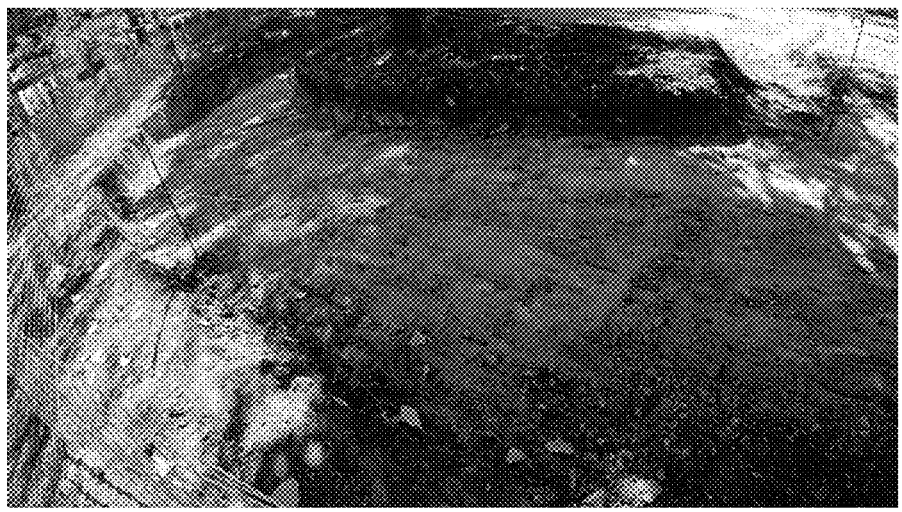
FIG. 5 illustrates example visual content evaluated using a contrast metric.
Figure 5:

The contrast metric may refer to a metric that measures visual content based on contrast of the visual content. The contrast metric may characterize a range of colors within the visual content. The value of the contrast metric may depend on the extent to which the visual content includes capture of well contrasted visual content. The value of the contrast metric may be low/minimized if the visual content is uniform or poorly exposed, and high/maximized if the visual content is well contrasted (e.g., well contrasted in luminance and colors, uses full intensity range, does not favor one particular gray level, have high number/maximum of vivid colors) (or vice versa). For example, referring to FIG. 5, the value of the contrast metric for the visual content 502 may be lower than the value of the contrast metric for the visual content 504 (or vice versa), and indicate that the visual content 504 has a better contrast of visual content than the visual content 502.

A value of the contrast metric for visual content may be determined based on the luminance and color contrast over the visual content, with the value being dependent on intensity ranges of vivid colors. The channels used to determine the value of the contrast metric may include one or more of a red channel, a green channel, a blue channel (RGB color space), a hue channel, a saturation channel, a value channel (HSV color space), and/or a Y histogram (e.g., 12-bit Y histogram). A well-contrasted visual content may have flat luminance and hue histogram, and a high color standard deviation to reflect high dynamic range and vivid colors of the visual content. The value of the contrast metric may be determined based on entropy of luminance and hue channel histogram. In some implementations, the hue histogram may be computed over a thumbnail (e.g., 64×48) while the luminance histogram may be computed over the full visual content (e.g., in 12 bits). The value of the contrast metric may be determined further based on standard deviation over the saturation channel, and a circular standard deviation over the hue channel. In some implementations, the value of the contrast metric for visual content may be determined based data provided by an image capture device (e.g., in a binary dump).

The value of the contrast metric for visual content may be determined based on luminance disparity, color disparity, color contrast, and/or other pixel characteristics of the visual content. Luminance disparity may be computed based on an entropy of a luminance histogram. Color disparity may be computed over the histogram of the hue channel. The color contrast may be computed based on one or more standard deviations, such as a classic standard deviation computed over the saturation channel, and/or a circular standard deviation computed over the hue channel.

Figure 6:
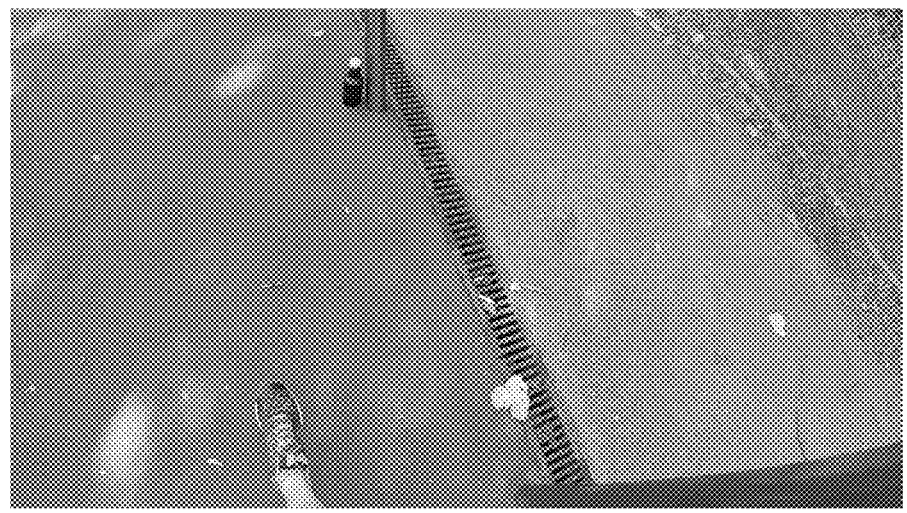
FIG. 6 illustrates example visual content evaluated using a uniformity metric.
Figure 6:

The uniformity metric may refer to a metric that measures visual content based on uniformity of the visual content. The uniformity metric may characterize uniformity of the visual content. The value of the uniformity metric may depend on the extent to which the visual content mainly includes one color and/or has poor local gradient magnitude. The value of the uniformity metric may be low/minimized if the visual content is uniform (e.g., images of floor, ground or sky, badly contrasted images), and high/maximized if the visual content is not uniform (or vice versa). For example, referring to FIG. 6, the value of the uniformity metric for the visual content 602 may be lower than the value of the uniform uniformity for the visual content 604 (or vice versa), and indicate that the visual content 604 is less uniform than the visual content 602.

A value of the uniformity metric for visual content may be determined based on computation of cumulative histograms and entropy of histograms of one or more channels (e.g., hue channel) and the local minimum/maximum ratio image. In some implementations, the value of the uniformity metric for visual content may be determined based data provided by an image capture device (e.g., in a binary dump). In some implementations, the value of the uniformity metric for visual content may be determined using one or more weighted masks. A weighted mask may give different importance to uniformity of different portions within the visual content. For example, a weighted mask may give more weight to center part of the visual content than other parts of the visual content (e.g., increase weights for pixels in the center of the visual content and decrease weights for pixels close to the borders) to account for the likelihood that a person may pay more attention to the center of the visual content than its border. A weighted mask may be obtained by computing a two-dimensional Gaussian mask. Additionally, color information may be used with luminance information to discriminate visual content with different number of histogram modes, and/or entropy may be computed to further improve the quality of the uniformity metric.

In some implementations, values of different content metrics may be combined to determine a score for the visual content. Values of different content metrics may be weighed the same or different for score degermation. Visual content may be identified as including a depiction of interest based on one or more values of the content metrics, score, and/or other information. For example, visual content determined to have a score that satisfies a particular content metric threshold and/or a score threshold (e.g., same as or greater than a threshold value) may be identified as including a depiction of interest.

The generation component 104 may be configured to generate one or more images from the visual content based on the depiction(s) of interest and/or other information. The image(s) may include one or more portions of the visual content including the depiction(s) of interest. An image including one or more portions of the visual content including a depiction of interest may include the image including the entire spatial view of the visual content (e.g., entire scene captured within an image) or one or more spatial portions of the visual content (e.g., one or more portions of a scene captured within an image). The generated image(s) may be provided (e.g., presented on a display, transmitted to a computing device) for user selection, storage, upload, and/or other operations.

Generating an image may include creating, encoding, storing, marking, and/or otherwise generating the image. For example, generating an image from visual content may include encoding, creating, and/or storing one or more files including information that defines the image, with the image including one or more portions of the visual content. Generating an image from visual content may include creating, marking, and/or storing information that defines the visual content. For example, based on visual content including a depiction of interest, some or all of the visual information defining the visual content may be marked (e.g., as including a depiction of interest) and/or stored within the electronic storage 13. Based on visual content including a depiction of interest, information defining some or all of the visual content may be created, marked, modified, and/or stored within the electronic storage 13. Other generation of images are contemplated.

In some implementations, storage of information defining visual content may include permanent storage of the information. For example, visual information defining visual content may be temporarily stored during identification of depiction of interest. Based on the visual content including a depiction of interest, one or more images of the visual content and/or information defining some or all of the visual content may be stored in non-volatile memory. Based on the visual content not including a depiction of interest, the information defining the visual content may be discarded (e.g., deleted; removed from memory, such as the electronic storage 310; left in memory buffer to be overwritten).

In some implementations, a depiction of interest may occur during a moment of interest, and the image(s) generated by the generation component 104 may include one or more images at the moment of interest. For example, the depiction of interest may occur at a point in time and/or a duration of time, and the generation component 104 generate image(s) from visual content captured at the point in time and/or captured during the duration of time. That is, the generation component 104 may generate images from visual content captured at the moment of interest.

In some implementations, image(s) generated by the generation component 104 may include one or more preceding images, one or more subsequent images, and/or other images. A preceding image may refer to an image including visual content captured prior to the moment of interest. A preceding image may correspond to a moment of time preceding the moment of interest. A subsequent image may refer to an image including visual content captured after the moment of interest. A subsequent image may correspond to a moment of time subsequent to the moment of interest. For example, the depiction of interest may occur at a point in time and/or a duration of time, and the generation component 104 generate image(s) from visual content captured before and/or after the point in time and/or the duration of time. The generation component 104 may generate images from visual content captured around the moment of interest. The generation component 104 may generate images from visual content captured at the moment of interest to the visual content captured after the moment of interest. The generation component 104 may generate images from visual content captured before the moment of interest to the visual content captured at the moment of interest.

In some implementations, a depiction of interest may occur during a moment of interest, and a number of the image(s) generated by the generation component 104 may be determined based on classification of one or more activities within the visual content during the moment of interest, classification of one or more actions within the visual content during the moment of interest, and/or other information. For example, the number of images generated by the generation component 104 for a depiction of interest may be determined based on a hierarchy of classification of things depicted within the visual content. For instance, an activity may include a person biking or surfing, and an action may include the person falling. The number of images generated for a person falling while biking may be the same or different from the number of images generated for the person falling while surfing. In some implementations, an action (e.g., falling) may be associated with a certain number of images and the number of images may be adjusted (increased, decreased) based on the activity (e.g., biking, surfing) during which the action takes place.

In some implementations, the number of the image(s) generated by the generation component 104 may be determined further based on classification of one or more locations within the visual content during the moment of interest. For example, the number of images generated for an activity and/or an action occurring at the beach may be different than the number of generated for the activity and/or action occurring under the water.

In some implementations, a number of the image(s) generated by the generation component 104 may be determined based on motion within the visual content and/or other information. Motion within the visual content may refer to movement of pixels defining the visual content. The pixels defining the visual content may move due to the corresponding thing moving and/or the image capture device moving. The motion of the visual content may be determined based on analysis of the visual content (e.g., optical flow analysis), analysis of information generated by a motion sensor (e.g., information generated by one or more inertial measurement units, one or more accelerometers, one or more gyroscopes, and/or other motion sensors of the image capture device), and/or other information. For example, a greater number of images may be generated based on visual content including motion or including greater amount of motion than for visual content not including motion or including less amount of motion. For instance, capture of activity with lots of motion (e.g., motion of the activity, motion of the image capture device) may result in greater number of images being generated than capture of stationary shots. Use of other intelligence and/or other techniques to determine the number of images for generation are contemplated.

In some implementations, the generation component 104 may be configured to generate one or more videos based on the visual content and/or other information. That is, in addition to generation of images, the generation component 104 may generate one or more videos based on the visual content. A video generated by the generation component 104 may have a progress length, defined in terms of time duration of the video and/or a number of video frames included within the video. A video generated by the generation component 104 may span one or more durations of time during which visual content is captured by an image capture device. For example, a video generated by the generation comment 104 may span a duration during which the image capture device is operating in a smart image capture mode. The generation component 104 may generate a video for individual ones of the identified depiction of interest. For instance, for a depiction of interest occurring at a moment of interest, the generation component 104 may generate a short video clip starting from, around, or ending at the moment of interest. The image(s) generated by the generation component 104 may be provided as highlight images of the video(s). That is, rather than requiring a user to manually identify and/or extract certain video frames of a video as a highlight image, the image(s) automatically generated by the generation component 104 may serve as the highlight image(s).

In some implementations, the image(s) generated by the generation component 104 may be provided as preview of the video(s). For example, a user may be presented with multiple images of a video, and the user's selection of an image may result in playback of the video starting from or near the video frame that corresponds to the selected image. The images may serve as links to different moments within the progress length of the video.

In some implementations, a number of the image(s) generated by the generation component 104 may be determined based on a progress length of a video and a number of identified depictions of interest. For example, longer length of the progress length and/or greater number of identified depictions of interest may result in a larger number of images being generated by the generation component 104. A long video with a few number of identified depictions of interest may result in a greater number of images being generated per identified depictions of interest while a short video with a large number of identified depictions of interest may result in a fewer number of images being generated per identified depictions of interest. Other determination of number of images based on the progress length of a video and the number of identified depictions of interests are contemplated.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible computer-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11 and the electronic storage 13 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be configured to execute one or more components by software; hardware; firmware; some combination of software, hardware, and/or firmware; and/or other mechanisms for configuring processing capabilities on the processor 11.

It should be appreciated that although computer components are illustrated in FIG. 1 as being co-located within a single processing unit, in implementations in which processor 11 comprises multiple processing units, one or more of computer program components may be located remotely from the other computer program components. While computer program components are described as performing or being configured to perform operations, computer program components may comprise instructions which may program processor 11 and/or system 10 to perform the operation.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
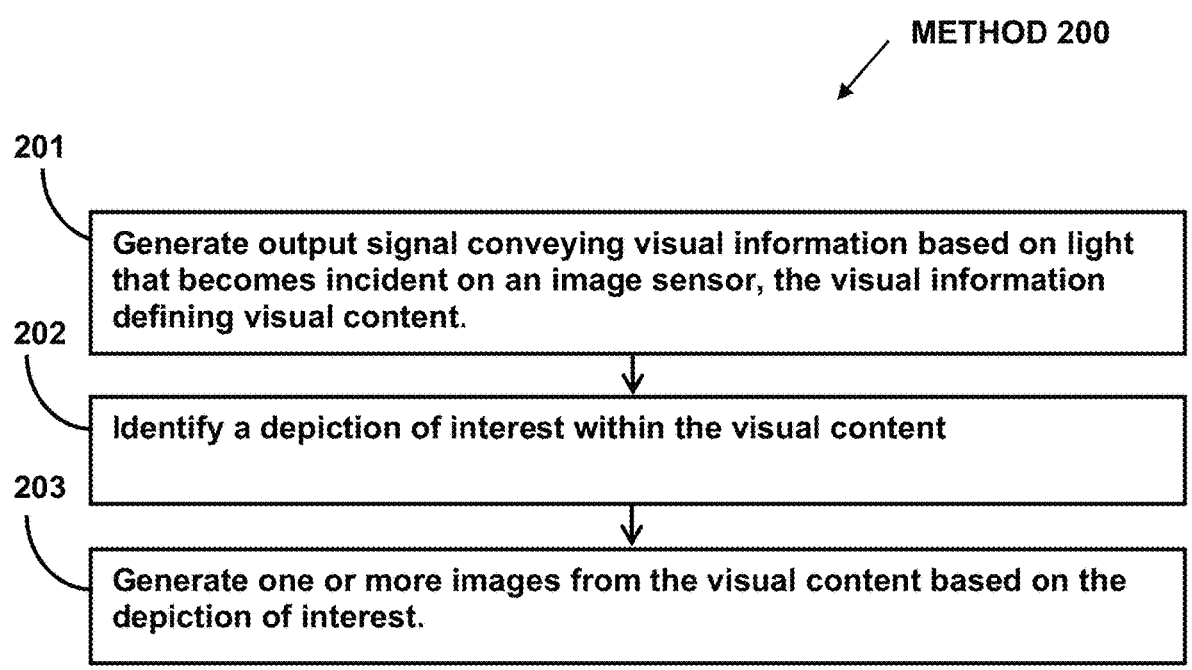
FIG. 2 illustrates a method for automatically capturing images.

FIG. 2 illustrates method 200 for operating an image capture device. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage mediums. The one or more processing devices may include one or more devices configured through hardware, firmware, and/or software to be specifically designed for execution of one or more of the operation of method 200.

Referring to FIG. 2 and method 200, at operation 201, output signal conveying visual information may be generated based on light that becomes incident on an image sensor. The visual information may define visual content. In some implementation, operation 201 may be performed by a component the same as or similar to the image sensor 306 (Shown in FIG. 3 and described herein).

At operation 202, a depiction of interest within the visual content may be identified. In some implementations, operation 202 may be performed by a processor component the same as or similar to the interest detection component 102 (Shown in FIG. 1 and described herein).

At operation 203, one or more images may be generated from the visual content based on the depiction of interest. The image(s) may include one or more portions of the visual content including the depiction of interest. In some implementations, operation 203 may be performed by a processor component the same as or similar to the generation component 104 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. An image capture device comprising:
   a housing;
   an image sensor carried by the housing and configured to generate an output signal conveying visual information based on light that becomes incident thereon, the visual information defining visual content;
   an optical element carried by the housing and configured to guide light within a field of view to the image sensor; and
   one or more physical processors carried by the housing, the one or more physical processors configured by machine-readable instructions to:
      identify a depiction of interest within the visual content, the depiction of interest occurring during a moment of interest;
      determine a number of images to be generated from the visual content based on classification of an activity and classification of an action within the visual content during the moment of interest; and
      generate the number of images from the visual content based on the depiction of interest, the number images that are generated including one or more portions of the visual content including the depiction of interest.

2. The image capture device of claim 1 wherein the depiction of interest within the visual content is identified based on depiction of one or more things within the visual content and/or one or more visual characteristics of the visual contents.

3. The image capture device of claim 1 wherein the number of images that are generated include one or more preceding images corresponding to one or more moments of time preceding the moment of interest and/or one or more subsequent images corresponding to one or more moments of time subsequent to the moment of interest.

4. The image capture device of claim 1, wherein the number of images to be generated from the visual content is determined by the one or more physical processors further based on classification of a location within the visual content during the moment of interest.

5. The image capture device of claim 1, wherein the number of to be generated from the visual content is determined by the one or more physical processors further based on motion within the visual content.

6. The image capture device of claim 1, wherein the one or more physical processors are further configured by the machine-readable instructions to:
   generate a video based on the visual content; and
   provide the number of images that are generated as preview of the video.

7. The image capture device of claim 6, wherein the number of images to be generated from the visual content is determined by the one or more physical processors further based on a progress length of the video and a number of identified depictions of interest.

8. The image capture device of claim 1, wherein the number of images are generated from the visual content by the one or more physical processors based on an operation of the image capture device in a smart image capture mode, the operation of the image capture device in the smart image capture mode including setting, by the one or more physical processors, of a first resolution to generate the one or more images and not including generation, by the image capture device, of a video.

9. The image capture device of claim 8, wherein the first resolution is higher than a second resolution with which the image capture device generates videos.

10. A method for generating images, the method performed by an image capture device including an image sensor configured to generate an output signal conveying visual information based on light that becomes incident thereon, the visual information defining visual content, the method comprising:
    identifying a depiction of interest within the visual content, the depiction of interest occurring during a moment of interest;
    determining a number of images to be generated from the visual content based on classification of an activity and classification of an action within the visual content during the moment of interest; and
    generating the number of images from the visual content based on the depiction of interest, the number of images that are generated including one or more portions of the visual content including the depiction of interest.

11. The method of claim 10, wherein the depiction of interest within the visual content is identified based on depiction of one or more things within the visual content and/or one or more visual characteristics of the visual contents.

12. The method of claim 10, wherein the number of images that are generated include one or more preceding images corresponding to one or more moments of time preceding the moment of interest and/or one or more subsequent images corresponding to one or more moments of time subsequent to the moment of interest.

13. The method of claim 10, wherein the number images to be generated from the visual content is determined further based on classification of a location within the visual content during the moment of interest.

14. The method of claim 10, wherein the number of images to be generated from the visual content is determined further based on motion within the visual content.

15. The method of claim 10, further comprising:
    generating a video based on the visual content; and
    providing the number of images that are generated as preview of the video.

16. The method of claim 15, wherein the number of images to be generated from the visual content is determined further based on a progress length of the video and a number of identified depictions of interest.

17. The method of claim 10, wherein the number of images are generated from the visual content based on an operation of the image capture device in a smart image capture mode, the operation of the image capture device in the smart image capture mode including setting of a first resolution to generate the one or more images and not including generation of a video.

18. The method of claim 17, wherein the first resolution is higher than a second resolution with which the image capture device generates videos.

* * * * *